United States Patent [19]
Holtz et al.

[11] Patent Number: 5,372,826
[45] Date of Patent: Dec. 13, 1994

[54] READY-TO-EAT CEREAL FLAKES AND PROCESS FOR MAKING SAME

[75] Inventors: William E. Holtz, Barrington; Margo P. Pidgeon, Bollingbrook; Donn G. Vitek, Crystal Lake, all of Ill.

[73] Assignee: The Quaker Oats Company, Chicago, Ill.

[21] Appl. No.: 838,654

[22] Filed: Aug. 16, 1991

[51] Int. Cl.$^5$ ............................................. A23L 1/164
[52] U.S. Cl. ..................................... 426/93; 426/619; 426/620; 426/621
[58] Field of Search ................... 426/619, 620, 621, 93

[56] References Cited

U.S. PATENT DOCUMENTS

| | | | |
|---|---|---|---|
| 2,552,290 | 5/1951 | Lilly et al. | 99/80 |
| 2,693,419 | 11/1954 | Gager | 426/102 |
| 3,366,484 | 1/1968 | Weiss et al. | 426/102 |
| 3,544,332 | 12/1970 | Leebens | 99/83 |
| 3,868,471 | 2/1975 | Decelles et al. | 426/303 |
| 3,959,498 | 5/1976 | Lyall et al. | 426/93 |
| 4,232,047 | 11/1980 | Sair et al. | 426/96 |
| 4,350,714 | 9/1982 | Duvall | 426/559 |
| 4,431,674 | 2/1984 | Fulger et al. | 426/18 |
| 4,438,146 | 3/1984 | Colby et al. | 426/448 |
| 4,834,989 | 5/1989 | Bolles et al. | 426/28 |
| 4,837,112 | 6/1989 | Calandro et al. | 426/463 |
| 4,857,339 | 8/1989 | Maselli et al. | 426/621 |
| 4,949,628 | 8/1990 | van Lengerich | 99/353 |

OTHER PUBLICATIONS

"The Role of Twin Extrusion Cooking in the Production of Breakfast Cereals"; D. Orr; *Institute of Chemical Engineers Symposium Series 1984*, No. 84, pp. 61–66.
"Fundamental and Practical Aspects of Twin Screw Extrusion"; J. Fichtali and F. van de Voort; *Cereal Foods World*, vol. 34, No. 11, pp. 921–929 (1989).
"Single Screw vs Twin Screw Extrusion"; B. Hauck and G. Huber; *Cereal Foods World*, vol. 34, No. 11, pp. 930–939 (1989).
"Twin Screw Extrusion of Corn Flakes"; T. Midden; *Cereal Foods World*, vol. 34, No. 11, pp. 941–943 (1989).
"Flaking Ready-To-Eat Breakfast Cereals"; R. Fast, G. Lauhoff, D. Taylor and S. Getgood; *Cereal Foods World*, vol. 35, No. 3, pp. 295–298 (1990).
"Breakfast Cereals: Processed Grains for Human Consumption"; R. Fast; *Cereal Foods World*, vol. 32, No. 3, pp. 241–244 (1987).
"Toasting and Toasting ovens for Breakfast Cereals"; R. Fast, F. Shouldice, W. Thomson, D. Taylor and S. Getgood; *Cereal Foods World*, vol. 35, No. 3, pp. 299–310 (1990).

*Primary Examiner*—Jeanette Hunter
*Assistant Examiner*—Mary S. Mims
*Attorney, Agent, or Firm*—Mart C. Matthews; Lars S. Johnson

[57] ABSTRACT

The present invention relates to ready-to-eat cereal flakes having edible particulate matter embedded therein and attached thereto, as well as a process for preparing said cereal flakes. More specifically, the present invention comprises a ready-to-eat cereal flake comprising cooked cereal grain and edible particulate matter embedded therein in a substantially uniform manner; a ready-to-eat cereal flake having edible particulate matter embedded therein and additionally having edible particulate matter attached to the surface of said flake; and processes for preparing such ready-to-eat cereal flakes.

18 Claims, No Drawings

READY-TO-EAT CEREAL FLAKES AND PROCESS FOR MAKING SAME

FIELD OF INVENTION

The present invention relates to ready-to-eat cereal flakes having edible particulate matter embedded therein and attached thereto, as well as a process for preparing said cereal flakes.

BACKGROUND OF INVENTION

Ready-to-eat breakfast cereals in flake form have been produced by cereal companies for years. These cereal flakes typically contain cereal grains such as wheat, rice, oats, corn, etc. The cereal flakes also contain a number of ancillary ingredients such as vitamins for fortification, sugars, salts, natural and artificial flavoring agents and other agents such as oils, coloring agents and natural and artificial preservatives. In addition to the ingredients incorporated into the cereal flake itself, other separate ingredients are included with the cereal flake in the cereal product as packaged and sold to the consumer. Examples of such added ingredients include nuts and nut pieces, fruit and fruit pieces, etc. These added ingredients are typically included to impart desirable flavor and texture properties to the packaged cereal product.

However, there are several problems which arise when combining such added ingredients with the cereal flakes in the packaged cereal product. One problem is that the added nuts and nut pieces and fruit and fruit pieces are not uniformly distributed throughout the cereal package. This is due to several factors, the primary factor being that the cereal and added ingredients are typically introduced to the packaged cereal product from separate process streams, and thus tend to remain separate upon packaging. Another source of this non-uniform distribution is unequal settling rates due to the differing densities of the cereal flakes and the added ingredients. The ingredient having the greater density tends to settle faster than the ingredient having the lesser density. This lack of uniform distribution of flakes and added ingredients is undesirable because the cereal product, when consumed, does not provide a uniform taste sensation, which would be preferred. While it may be possible to remedy this separation problem by mechanically manipulating the cereal flakes and added ingredients to achieve greater mixing, such a solution carries the risk of physically damaging the cereal flakes.

The present invention provides a solution to this problem of non-uniform distribution by providing a unique process for preparing a cereal flake wherein the added ingredients are embedded into the flake itself in a substantially uniform manner throughout the flake, and in a preferred mode are also attached to the flake surface. The flake resulting from this process provides a cereal product having a desirable taste and textural profile.

A further benefit of the process of the present invention is that the added ingredients which are embedded into the cereal flake are not subjected to the extreme cooking conditions that the cereal dough itself is subjected to, which can destroy or negatively alter the flavor of certain added ingredients, such as fruit and fruit pieces, flavors, spices, etc.

BACKGROUND ART

The art teaches preparing cereal flakes via a process which utilizes an extrusion step. The article "Twin Screw Extrusion of Corn Flakes" T. Midden, *Cereal Foods World*, Vol. 34, No. 11, pp. 941-943 (1989), teaches a method for preparing corn flakes wherein the flake ingredients are batch mixed and fed into an extruder. In the extruder, the ingredients are cooked, cooled and processed into spaghetti-like strands. After cooling, these strands are cut into pellets, which are sent forward for flaking and toasting according to traditional methods. However, this reference does not teach or suggest any method for incorporating edible particle matter, such as nuts, etc., directly into the cereal flake.

U.S. Pat No. 4,949,628, issued Aug. 21, 1990 to van Lengerich, teaches an apparatus for producing a product having a cookie-like crumb structure. The apparatus generally comprises, among other components, an extruder, a temperature control means for the extruder, a microwave applicator incorporated into the extruder, and a second stage mixing apparatus which includes an inlet port coupled to the downstream end of the extruder housing. The second stage mixing apparatus is preferably an extruder when a pressure build up is required for shaping, for example through an extrusion die. As with the Midden reference discussed above, this reference also fails to teach or suggest any method for incorporating edible particulate matter directly into a cereal flake.

U.S. Pat No. 3,544,332, issued Dec. 1, 1970 to Leebens, teaches a process wherein powdered or granulated additives are incorporated into the cereal flake. In the Leebens' process a cereal mix which comprises primarily wheat flour is introduced into an extruder. The cereal mix is cooked in the extruder to form a dough. The cooked dough is then puffed, either by conventional puffing guns or by other puffing methods, thereby forming voids in the dough. The puffed dough is then formed into pieces which are the proper size for flaking, typically by cutting the dough rope into slices with a cutter. The cut slices of dough, together with powdered or granulated additives such as flavoring agents, sweetening agents, enriching agents and the like, are placed in a rotary drum together. The slices are coated by the powdered or granulated additive in the rotary drum in such a manner that the additives form a layer of material on the outer surface of the pieces and on the surface or walls of the voids in the pieces. The coated pieces are discharged from the rotary drum and deposited on a belt which cooperates with a flaking roller to perform the flaking step. During the flaking step each piece, with its many voids, is collapsed. Upon collapsing, the voids are closed and the piece is formed into a flake, which has a number of breaks extending from the surface of the flake toward the interior of the flake. The powdered or granulated additives which were sticking to the walls of the voids and on the surface of the expanded slice are trapped in the breaks and consequently are trapped at or near the surface of the flake. When a consumer eats one of the flakes, the concentrated form of the additive which is at or near the flake surface is allegedly recognized by the consumer's taste buds. Further, the patent claims that any additives which are difficult to incorporate into ready-to-eat cereal flakes may be incorporated in this manner without destruction due to cooking or the like.

There are several shortcomings of the Leebens' process. Foremost, the additives incorporated into the cereal flake must be powdered or granulated. This is necessary because the additives must be small enough to fit into the voids in the flake and stick to the walls of said voids. This limitation on the additive size effectively precludes the use of several additives. For example, whole grains, fruit pieces, nut pieces, etc., couldn't be used in Leebens' process. Therefore, products having the taste and texture profile that can be achieved using larger, non-powdered and non-granulated particles, cannot be prepared by the Leebens' process.

Additionally, the mechanical processing necessary to powder or granulate the additive in the Leebens' process can have a detrimental effect on the flavor of certain ingredients. Another shortcoming is in the appearance of the flake, which lacks any aesthetic benefit from the inclusion of fruit pieces and nut pieces. Since the Leebens' additives must be powdered or granulated, they will not be very noticeable and thus will not enhance the appearance or texture of the flake. The present invention provides for cereal flakes wherein the additives incorporated therein are larger, and thus make the flake more visually appealing. A final, potential disadvantage of the Leebens' process is that the additives tend to be concentrated on the surface of the flake, resulting in a non-blended, non-uniform flour profile. For certain ingredients the substantially uniform distribution of the ingredient throughout the flake, as provided by the process of the present invention, may be preferred for flavor, texture or aesthetic reasons.

Given the shortcomings of the prior art, it would be desirable to provide a process for preparing ready-to-eat cereal flakes having added ingredients embedded therein, wherein such ingredients are of sufficient size to provide a unique taste and texture profile and render the flake more aesthetically appealing, wherein such additions have undergone a limited amount of mechanical and thermal processing so as to not negatively impact on their flavor, and wherein such additives are distributed throughout the flake in a substantially uniform manner. It would further be desirable to provide a process wherein the additive embedded in the flake can be embedded in the cooked flake without being subjected to the extreme cooking conditions which the cereal dough is subjected to.

It is therefore an object of the present invention to provide a unique cereal flake wherein edible particulate matter, such as fruit and fruit pieces, granola, nuts and nut pieces, and cereal grains such as oat flakes, and mixtures thereof, is embedded in the cereal flake in a substantially uniform manner.

It is another object of the present invention to provide a flake wherein such embedded particles have not been subjected to the extreme cooking conditions which the cereal dough used to prepare the cereal flake has been subjected to.

It is also an object of the present invention to provide for such a unique cereal flake wherein said edible particulate matter is additionally attached to the flake surface.

It is a further object of the present invention to provide a method for preparing such cereal flakes having such edible particulate matter embedded therein and attached thereto.

These objects are accomplished by the invention described herein.

SUMMARY OF THE INVENTION

The present invention comprises a ready-to-eat cereal flake comprising cooked cereal grain and edible particulate matter embedded therein in a substantially uniform manner. The present invention also comprises such a ready-to-eat cereal flake having edible particulate matter embedded therein and additionally having edible particulate matter attached to the surface of said flake.

The present invention additionally comprises a process for preparing such ready-to-eat cereal flakes having edible particulate matter embedded therein, said process comprising: (a) preparing a dry mix comprising cereal grain and a plasticizer; (b) introducing the dry mix and water into an initial cooking and forming step under conditions sufficient to produce a cooked cereal dough product; (c) introducing edible particulate matter and the cooked cereal dough product into a secondary forming step under conditions sufficient to form a secondary cereal dough product having particulate matter dispersed therein; and (d) converting the secondary cereal dough into flakes.

The present invention further comprises a process for preparing such ready-to-eat cereal flakes which additionally have edible particulate matter attached thereto, said processes comprising: (a) preparing a dry mix comprising cereal grain and a plasticizer; (b) introducing the dry mix and water into an initial cooking and forming step under conditions sufficient to produce a cooked cereal dough product; (c) introducing edible particulate matter and the cooked cereal dough product into a secondary forming step under conditions sufficient to form a secondary cereal dough product having particulate matter dispersed therein; (d) converting the secondary cereal dough into flakes; and (e) enrobing the flakes with edible particulate matter and a vehicle for attaching said edible particulate matter to said flakes.

DETAILED DESCRIPTION OF THE INVENTION

The present invention comprises a ready-to-eat cereal flake comprising cooked cereal grain and edible particulate matter embedded therein in a substantially uniform manner. By ready-to-eat it is meant that the flake can be consumed without any further preparation or processing.

The cereal flake can comprise any known cereal grain including, but not limited to, oats, wheat, rice, corn, barley and mixtures thereof, with oats being preferred and a mixture of oats and wheat being more preferred. The cereal grain component of the flake is cooked prior to flaking, and preferably prior to incorporation of the edible particulate matter.

The particulate matter embedded into the cereal flake can be selected from any known edible material, although it is preferred that the edible material be compatible in taste with the cereal grain component of the flake. Examples of edible particulate matter useful in the present invention include, but are not limited to: granola; real and imitation fruit and fruit pieces, including dehydrated fruit, such as raisins, pieces of peaches, apples, pears, apricots, strawberries, blueberries, raspberries, bananas; real and imitation nuts and pieces of nuts such as almonds, peanuts, cashews, walnuts; whole, sliced and chopped pieces of raw and cooked grains and seeds such as oats, wheat, barley, corn, rice, sunflower seeds, sesame seeds; vegetables and pieces of vegetable materials; wheat germ composite materials prepared from wheat germ and oil; and confectionery items, such as cookies, candies, and marshmallows. Granola, real fruit and fruit pieces, including dehydrated fruit and fruit pieces, and whole raw oat particles are preferred for their flavor and nutritional properties.

The particle size of the embedded particulate matter is effectively limited by the size of the flake, and is preferably in the range of from about 0.15 centimeters (cm) to about 1.0 cm, more preferably from about 0.30 cm to about. 0.65 cm, so as to impart desirable flavor, visual and textural properties to the flake.

As already stated herein, the edible particulate matter is embedded in the cereal flake in a substantially uniform manner. By "substantially uniform manner" it is meant that the particulate matter tends to be distributed throughout the entire flake interior, averaged over a significant quantity of flakes, without a significant tendency to be concentrated in any particular region of the flake. Furthermore, the size of the embedded particles may be so large as to cause the particle to protrude through the top and bottom surface of the flake simultaneously, thereby allowing for a uniform distribution throughout the flake in the top to bottom surface direction. The meaning of the phrase should become more apparent upon explanation and understanding of the process for preparing the flake claimed below.

The embedded cereal flakes of the present invention typically comprise on a dry basis, from about 60% to about 85%, preferably from about 75% to about 65% by weight cooked cereal grain, and from about 15% to about 40%, preferably from about 25% to about 35% by weight embedded edible particulate matter. The moisture content of the flakes range from about 1% to about 5%, preferably from about 2% to about 4% by weight. The cooked cereal grain is defined as the portion of the flake present prior to the addition of the edible particulate matter, and preferably comprises from about 35% to about 65%, more preferably from about 45% to about 55% by weight oat cereal grain and from about 35% to about 65%, preferably from about 45% to about 55% by weight wheat cereal grain.

In addition to the cereal grain and edible particulate matter, the embedded cereal flakes of the present invention may contain additional edible components typically found in ready-to-eat cereal flakes. Examples of such additional components include, but are not limited to, sweeteners such as brown sugar, fructose, sucrose, and mixtures thereof and artificial non-nutritive sweeteners such as saccharine. cyclamates and aspartame and mixtures thereof; vitamins; natural and artificial preservatives such as tocopherols, vitamin C, BHA, BHT and mixtures thereof; additional fiber sources such as wheat bran and carboxymethylcellulose ("CMC"); natural and artificial flavoring agents such as vanilla, vanillin and benzaldehyde; salt, and leavening agents such as sodium bicarbonate, sodium aluminum phosphate and trisodium phosphate. When included in the cereal flakes of the present invention, such additional components are typically present at the following concentrations: from about 1% to about 20%, preferably from about 5% to about 10% by weight sweetener; from about 0.1% to about 0.5%, preferably from about 0.2% to about 0.4% by weight total vitamins; from about 0.1% to about 0.5%, preferably from about 0.2% to about 0.3% by weight preservatives; from about 0.5% to about 3.0%, preferably from about 1.0% to about 2.0% by weight salt; and from about 0.1% to about 0.5%, preferably from about 0.2% to about 0.4% by weight natural and artificial flavoring agents.

The embedded cereal flakes of the present invention are preferably prepared by combining cereal grain with the edible particulate matter, together with any optional ingredients such as sweeteners, flavoring agents and vitamins, by the method described and claimed in this patent, although such a method is not required.

A preferred embedded cereal flake of the present invention additionally comprises edible particulate matter attached thereto and a vehicle for attaching said edible particulate matter. The attachment of edible particulate matter to the surface provides for a flake having further unique flavor and texture properties, in addition to the properties of the embedded flake.

The edible particulate matter attached to the flake is of the same general type as embedded in the flake, although it need not be identical. For example, a particular cereal flake could have embedded therein granola and fruit and have attached thereto rolled, raw oat flakes, which are preferred for their flavor, textural and nutritional properties.

The vehicle for attaching the edible particle may be any known to those skilled in the art. Examples of vehicles useful herein include syrups or gels, such as hydrated starches, with syrups being preferred. Such syrups typically comprise water; one or more sweeteners such as brown sugar, sucrose, fructose, and mixtures thereof; one or more non-nutritive sweeteners such as saccharine, cyclamates, aspartame, and mixtures thereof; salt; corn syrup solids, and natural and artificial flavoring agents such as coconut, vanilla, vanillin and benzaldehyde. Such syrups may additionally contain optional ingredients such as natural and artificial preservatives such as tocopherols, vitamin C, BHA and BHT. A preferred syrup comprises from about 40% to about 60%, more preferably from about 45% to about 55% by weight sweetener, preferably brown sugar; from about 15% to about 30%, more preferably from about 20% to about 25% by weight corn syrup solids; from about 20% to about 40%, more preferably from about 25% to about 35% by weight water; from about 0.01% to about 0.10%, more preferably from about 0.025% to about 0.075% flavoring agents, preferably natural coconut flavor; and from about 1.0% to about 2.5%, more preferably from about 1.25% to about 1.75% by weight salt, preferably sodium chloride.

This preferred flake having attached and embedded edible particulate matter typically comprises, on a dry basis, from about 30% to about 50%, preferably from about 35% to about 45% by weight of cooked cereal grain, said cooked cereal grain component comprising from about 35% to about 65%, preferably from about 45% to about 55% by weight oat cereal grain and from about 35% to about 65%, preferably from about 45% to about 55% by weight wheat cereal grain; from about 10% to about 30%, preferably from about 15% to about 25% by weight embedded edible particulate matter; from about 5% to about 25%, preferably from about 10% to about 20% by weight attached edible particulate matter; from about 10% to about 30%, preferably from about 15% to about 25% by weight (on a wet basis) vehicle for attaching said edible particulate matter to said flake; and has a moisture content in the range of from about 20% to about 40%, preferably from about 25% to about 35% by weight.

This preferred embedded flake with attached edible particulate matter is preferably prepared by the method described and claimed in this patent.

The present invention further comprises a process for preparing ready-to-eat cereal flakes of the general type already described herein as having edible particulate matter embedded therein in a substantially uniform manner. This process comprises: (a) preparing a dry mix comprising cereal grain and a plasticizer; (b) introducing the dry mix and water into an initial cooking and forming step under conditions sufficient to produce a cooked cereal dough product; (c) introducing edible particulate matter and the cooked cereal dough product into a secondary forming step under conditions sufficient to form a secondary cereal dough product having particulate matter dispersed therein; and (d) converting the secondary cereal dough to flakes.

The dry mix used in the process of the present invention comprises cereal grain and a plasticizer. The cereal grain can be any cereal grain known to those skilled in the art, and may be cooked or raw, with raw being preferred. Examples of such cereal grain include, but are not limited to, oats, wheat, rice, corn, barley, and mixtures thereof, with oats being preferred and a mixture of oats and wheat being more preferred.

The plasticizer used in the dry mix can be maltodextrin, brown sugar, fructose, sucrose, glucose, dextrose and mixtures thereof, with sucrose being preferred. The plasticizer is necessary for preparing a cooked cereal dough product which has the physical properties desired for the process of the present invention. Examples of such properties include expansion limiting effects, dough cohesiveness, and crispness.

In a preferred embodiment, the dry mix comprises from about 40% to about 60%, preferably from about 45% to about 55% by weight oat cereal grain, from about 35% to about 55%, preferably from about 40% to about 50% by weight wheat cereal grain, and from about 1% to about 10%, preferably from about 2% to about 8% by weight plasticizer.

In addition to the cereal grain and plasticizer, the dry mix may contain additional, optional ingredients including, but not limited to, non-nutritive sweeteners such as saccharine, cyclamates, aspartame and mixtures thereof; vitamins; natural and artificial preservatives such as tocopherols, vitamin C, BHA, BHT and mixtures thereof; additional fiber sources such as wheat bran, corn bran, CMC; natural and artificial flavoring agents such as vanilla, vanillin, benzaldehyde, honey; salt; and maltodextrin. When included in the dry mix, these additional components typically comprise from about 0.01% to about 0.10%, preferably from about 0.03% to about 0.07% by weight non-nutritive sweetener; from about 0.05% to about 0.3%, preferably from about 0.15% to about 0.20% by weight total vitamins; from about 0.1% to about 0.8%, preferably from about 0.2% to about 0.6% by weight preservatives; from about 0.5% to about 2.0%, preferably from about 1.0% to about 1.5% by weight salt; and from about 0.5% to about 3.0%, preferably from about 1.0% to about 2.0% by weight flavoring agents. These additional optional ingredients may also be incorporated into the process via the secondary forming step which is discussed in greater detail below, instead of in the dry mix.

The dry mix and water are introduced into an initial cooking and forming step. In the initial cooking and forming step, the dry mix is mixed further, cooked, and, optionally, cooled, and is thereby formed into a cooked cereal dough product. The initial cooking and forming step is preferably carried out in an extrusion device, which is referred to hereinafter as an initial extruder. When utilized, the initial extruder plasticizes the food mass, reduces microbial load, denatures enzymes, gelatinizes starch, polymerizes proteins, and texturizes the cooked cereal dough product. When an extruder is utilized in the process of the present invention, the cooked cereal dough product will typically be in the form of a continuous strand or rope.

Examples of extruders useful in the process of the present invention include, but are not limited to, single-screw and twin-screw extruders. The selection of the type of extruder will depend upon numerous considerations such as the composition of the dry mix, desired throughput, texture of the extrudate, degree of cooking, etc. In the present invention a twin-screw extruder is preferred.

Additionally, there are a wide range of operator controllable variables including screw speed, screw profiler temperature, moisture, feed rate, and die size/shaper which may be manipulated when an extruder is utilized. One skilled in the art will know to select operating parameters necessary to achieve the desired product characteristics. A more complete discussion on design factors and operating variable selection can be found in the article "Fundamental. and Practical Aspects of Twin Screw Extrusion", J. Fichtali and F. R. van de Voort, *Cereal Foods World*, Vol. 34, No. 11, pages 921–929 (1989), the disclosure of which is incorporated herein by reference.

The amount of water added in the initial cooking and forming step will depend upon the type of cereal grain used to prepare the dry mix, but will typically range from about 3% to about 36%, preferably from about 8% to about 25% by weight of the total dry mix. When the preferred oat/wheat cereal grain combination is used to prepare the dry mix, the amount of water added in the initial cooking and forming step will typically be in the range of from about 10% to about 25% by weight of the dry mix. The moisture level of the cooked cereal dough product resulting from the initial cooking and forming step ranges from about 25% to about 35%, preferably from about 28% to about 32% by weight.

The water may be combined with the dry mix prior to introduction to the initial extruder, or may be directly injected into the initial extruder at any point along the screw mechanism. When combined with the dry mix prior to introduction to the initial extruder, the cereal grain will be substantially fully hydrated and gelatinized at the completion of the initial cooking and forming step.

The cooking temperature of the dry mix/water combination in the initial cooking and forming step is typically in the range of from about 120° C. to about 205° C., preferably from about 135° C. to about 160° C., and is maintained for a corresponding time of from about 15 seconds to about 75 seconds, preferably from about 20 seconds to about 45 seconds.

When an initial extruder is utilized in the process of the present invention, the throughput necessary to produce a product having given characteristics will be based upon the geometry of the extruder, and will be apparent to one skilled in the art. For the present invention, throughput of the initial extruder typically ranges from about 22.5 to about 2,720 kg. cooked cereal dough per hour.

The cooked cereal dough product formed in the initial cooking and forming step is subjected, in conjunction with edible particulate matter, to a secondary forming step under conditions sufficient to form a secondary cereal dough product having particulate matter dispersed therein.

The secondary forming step may take place in the same initial extruder used for preparing the cooked cereal dough product, although in a later and preferably separate chamber, or may take place in a separate, secondary forming device. Examples of such separate, secondary forming devices include, but are not limited to: a forming extruder; a meat grinder, and a Readco Extructor or Extrude-O-Mix, (available from the Bepex Corporation, located in Rolling Meadows, Ill.), with the forming extruder being preferred. As with the initial extruder, the selection of the type of forming extruder and its operating variables will depend upon the desired properties of the final product, and will be known to those skilled in the art. A single-screw forming extruder is most preferred in the present invention.

The secondary forming step acts to mix the cooked cereal dough product and particulate matter, deaerate and compress the cooked cereal dough product, and additionally allows for a number of other desirable properties in the final cereal flake product, such as lowered dough viscosity, which provides for improved dough cutting when necessary for further processing, such as flaking, etc. The mixing action in the secondary forming step aids in the preparation of a product wherein the edible particulate matter is distributed throughout the flake in a substantially uniform manner, which in turn provides for unique and desirable flavor and texture properties in the final flake product.

The edible particulate matter introduced into the secondary forming step is of the type already described herein. The amount of such edible particulate matter introduced to the secondary forming step is dependent upon factors such as the type of particulate matter, the desired percentage of embedded particulate matter in the final product, the size of the flake to be produced, and so on. Generally, from about 0.10 to about 0.40 kg., preferably from about 0.25 to about 0.35 kg. edible particulate matter per kg. cooked cereal dough product is introduced into secondary forming step. Examples of typical amounts for specific types of edible particulate matter added to the secondary forming step include, but are not limited to, the following: from about 0.20 to about 0.40 kg., preferably from about 0.25 to about 0.35 kg. of granola per kg. cooked cereal dough product; from about 0.10 to about 0.25 preferably from about 0.10 to about 0.15 kg. of fruit and fruit pieces per kg. cooked cereal dough product; from about 0.10 to about 0.35 kg., preferably from about 0.10 to about 0.20 kg. of dehydrated fruit pieces per kg. cooked cereal dough product; from about 0.10 to about 0.30 kg., preferably from about 0.20 to about 0.30 kg. of nut pieces per kg. cooked cereal dough product; and from about 0.10 to about 0.40 kg., preferably from about 0.25 to about 0.35 kg. raw and/or cooked cereal grain, preferably raw oats, per kg. cooked cereal dough product.

The edible particulate matter is not necessarily cooked prior to introduction to the secondary forming step, and will not be substantially cooked therein. In the secondary forming step, the cooked cereal dough product/edible particulate matter mixture typically reaches a temperature in the range of from about 25° C. to about 100° C., preferably from about 65° C. to about 100°0 C., and is maintained at such temperature for a corresponding period typically ranging from about 0.5 minutes to about 5 minutes, preferably from about 0.75 minutes to about 2 minutes. Additional ingredients as already described herein, such as sweeteners, flavoring agents, preservatives, salts, etc., can additionally be incorporated into the final flake product via addition in the secondary forming step, in lieu of being added at other points in the process.

When the forming extruder is utilized, the secondary cereal dough product preferably exits the forming extruder in the form of a continuous strand, similar to a rope, through a die head. The selection of the type of die head used will depend upon the desired physical characteristics of the secondary cereal dough product and can be determined by one skilled in the art. Examples of desired physical characteristics influencing selection of the die head include, but are not limited to, land length, flow characteristics and temperatures of the secondary cereal dough product, size of the particulate matter contained in the secondary cereal dough product, pressure in the forming extruder, screw torque, etc. One skilled in the art will be able to select a die head based on these various parameters and the characteristics of a desired product.

While not intending to be bound by theory, it is unexpected and surprising that a cooked cereal dough product having as high a moisture content as the dough prepared using the preferred oat/wheat cereal grain combination (i.e., up to about 30% by weight moisture) could be flaked. One would normally expect that a dough having a high moisture content would be difficult or impossible to cut or pelletize and would adhere to any flaking rolls. It is believed that the flaking of this high moisture content dough is achieved through the use of the secondary forming step following the initial cooking and forming step, as described below.

After exiting the secondary forming step, the secondary cereal dough product is converted into flakes. This may be accomplished by methods known to those skilled in the art, and is typically accomplished by dividing, preferably by cutting, the secondary cereal dough product into separate pellets and then conveying the pellets to a flaking operation for conversion into flakes.

The pellets are preferably cut into discrete lengths in the range of from about 3.0 mm. to about 9.5 mm., preferably from about 5.0 mm. to about 7.0 mm. The cuts are typically perpendicular to the longitudinal axis of the secondary cereal dough product as it exits the cold former, although they may also be angular to the longitudinal axis. The cutting device typically comprises a single knife edge, which is preferred, although multiple knife edges and other cutting devices such as vertical or horizontal cutters may be used as well.

The conveyance of the pellets to the flaking step may be achieved by any method known to those skilled in the art. including, but not limited to, a pneumatic conveyor, a belt conveyor, buckets, etc. A pneumatic conveyor is the preferred method wherein the air used to convey the pellets also acts to cool and extract a negligible amount of moisture from the pellet surface, which renders the pellet surface no longer "sticky". This aids in the flaking of the pellets. If conveying methods other than pneumatic conveying are utilized, it is preferred that ambient air be directed across the pellet surface to extract a minimal amount of moisture from the pellet surface, thereby providing the already described benefits of the pneumatic conveying process.

Flaking of the pellets can be accomplished by any method known to those skilled in the art. A detailed description of flaking processes and devices can be found in the article "Flaking Ready-to-Eat Breakfast Cereals", P. Fast, G. Lauhoff, D. Tayler, S. Getgood, *Cereal Foods World*, Vol 25. No. 3, pp. 295-298 (1990), the disclosure of which is incorporated herein. Flaking is typically accomplished by a device which passes the pellets between a pair of rollers moving in either a counter direction or in the same direction at differing speeds, or between a roller and a flat surface. In any of the aforementioned methods the rollers or the roller and flat surface are spaced apart by a distance sufficient to produce the desired flake thickness. In accordance with the present invention a typical flake thickness ranges from about 0.10 mm to about 0.65 mm, preferably from about 0.20 mm to about 0.40 mm.

Following flaking, the flakes are preferably toasted. In the toasting step the flakes may also be coincidentally dried by the toasting action. Toasting may be done by any means known to those skilled in the art, such as those described in the article "Toasting and Toasting Ovens for Breakfast Cereals", R. Fast, F. Shouldice, W. Thomson, D. Taylor, S. Getgood, *Cereal Foods World*, Vol. 35, No. 3, pp. 299-310 (1990), the disclosure of which is incorporated herein. Examples of toasting methods useful in the present invention include, but are not limited to, infra-red lamps, an oven, etc. It is preferred to maintain a toasting temperature in the range of from about 120° C. to about 260° C., more preferably from about 130° C. to about 195° C., for a period of time ranging from about 0.2 to about 15 minutes, preferably from about 3 to about 9 minutes, respectively. The rate of toasting may be increased by spreading the flakes on an extended surface, such as in shallow pans or on a conveyer belt. After leaving the toasting device, the flakes typically have a moisture level ranging from about 0.5% to about 6%, preferably from about 1% to about 3% by weight. Following toasting, the flakes are typically allowed to cool and then are packaged and shipped.

In a preferred embodiment, the flakes are subjected to a coating step following flaking and prior to toasting. In the coating step the flake is coated with syrup to form a substantially continuous and discrete film thereon. The syrup is used in an amount ranging from about 20% to about 40%, preferably from about 25% to about 35% dry solids weight basis as a portion of the total flake weight. The syrup can be formed from any mono- or disaccharide, or mixtures thereof, including, but not limited to honey, brown sugar, corn syrup, sucrose, fructose and the like, and may include optional ingredients such as flavoring agents, salt, etc. The syrup preferably comprises from about 40% to about 60%, more preferably from about 45% to about 55% by weight sweetener, preferably brown sugar; from about 15% to about 30%, more preferably from about 20% to about 25% by weight corn syrup solids; from about 20% to about 40%, more preferably from about 25% to about 35% by weight water; from about 0.01% to about 0.10%, more preferably from about 0.025% to about 0,075% flavoring agents, preferably natural coconut flavor; and from about 1.0% to about 2.5%, more preferably from about 1.25% to about 1.75% by weight salt, preferably sodium chloride.

In a more preferred embodiment, the flakes prepared by the process of the present invention are dried immediately after coating. The flakes can be dried by any means known to those skilled in the art. In a typical drying operation, the flakes are subjected to a temperature ranging from about 121 degrees C. to about 260 degrees C., for a corresponding period of from about 0.2 to about 15 minutes. As with the toasting step, it is preferred that the flakes be spread on an extended surface, such as shallow pans or on a conveyor belt, during drying. Following drying, the flake typically has a moisture content ranging from about 0.5% to about 6%, preferably from about 1% to about 3% by weight.

The present invention further comprises a process for preparing ready-to-eat cereal flakes having edible particulate matter embedded therein and attached thereto. This preparation process comprises (a) initially preparing a dry mix comprising cereal grain and a plasticizer; (b) introducing the dry mix and water into an initial cooking and forming step under conditions sufficient to produce a cooked cereal dough product; (c) introducing edible particulate matter and the cooked cereal dough product into a secondary forming step under conditions sufficient to form a secondary cereal dough product having particulate matter dispersed therein; (d) converting the secondary cereal dough product to flakes; and (e) enrobing the flakes with edible particulate matter and a vehicle for attaching said edible particulate matter.

Steps (a)-(d) of this process are carried out in the same manner as already described herein for preparing the cereal flake having edible particulate matter embedded therein.

In step (e), the cereal flake is coated with edible particulate matter and a vehicle for attaching said particulate matter to the flake. The edible particulate matter attached to the flake is of the type already described herein. However, the particulate matter attached to the flake surface need not be the same as the particulate matter embedded therein. For example, granola could be embedded in the flakes while nuts are attached to the flakes.

The attachment vehicle coats the flake to form a substantially continuous and discrete film thereon and is typically in liquid form. It can be selected from any edible vehicle known to be useful to those skilled in the art. Examples of suitable attachment vehicles include, but are not limited to, syrups, gels and hydrated starches, with syrups being preferred. Such syrups preferably are the same as those already described herein as being useful for enrobing the embedded cereal flake.

The edible particulate matter which is attached to the flake surface is added in the enrobing step in an amount ranging from about 15% to about 35%, preferably from about 20% to about 30% by weight of the cereal flake weight. The attachment vehicle is used in an amount ranging from about 15% to about 35%, preferably from about 20% to about 30%, on a dry solids weight basis, of the cereal flake weight.

A preferred enrobing process comprises introducing the embedded cereal flake and edible particulate matter into a rotary drum which coincidentally transports said flakes and edible particulate matter in an axial direction. As the drum rotates, the flakes and particulate matter are mixed through a tumbling action. The attachment vehicle is concurrently sprayed onto the flakes and particulate matter, preferably from spray nozzles located axially at or near the top of the drum. When the sprayed flakes and particulate matter come in contact, they tend to stick together, thereby attaching said particulate matter to the flake surface. In such an enrobing process, the flakes which are enrobed are typically retained in the drum for a period of from about 0.5 to about 6 minutes, preferably from about 1 to about 2.5 minutes. The drum rotation speed is dictated by product density and flight width, and typically falls in the range of from about 7 RPM to about 30 RPM, preferably from about 13 RPM to about 20 RPM. The average bed thickness in such a drum is typically in the range of from about 1% to about 25% fill, preferably from about 5% to about 10% fill.

In a preferred embodiment, this process for preparing a cereal flake having edible particulate matter embedded therein and attached thereto comprises either an additional toasting step or drying step. The toasting step follows flaking and precedes enrobing, and is as already described herein for the process for preparing the embedded cereal flake. The drying step follows enrobing and is also as already described herein. In a most preferred embodiment, both the toasting and drying steps are included in the process of the present invention.

The present invention also provides for a cereal flake prepared by the process of the present invention having edible particulate matter embedded therein in a substantially uniform manner. The present invention further provides for a cereal flake prepared by the process of the present invention having edible particulate matter embedded therein and attached thereto.

The present invention is further illustrated, but not limited by, the following examples.

EXAMPLES

Example 1

A flake cereal which incorporates particulate matter into the cooked dough matrix of the flake is manufactured as described herein. The following process steps are required.

A. Base formula batch mixing
B. Extrusion/Cooking
C. Particulate additions
D. Pellet forming
E. Flaking
F. Toasting A. Base Formula Batch Mixing The following ingredients are mixed and fed into an extruder/cooker to provide a cooked dough of the proper characteristics. These ingredients are preconditioned prior to introduction into the extruder/cooker.

48.72% oat flakes
43.90% wheat flakes
5.00% brown sugar
1.50% sodium chloride
0 50% vitamins
0.38% preservative B. Extrusion/Cooking The extruder/cooker is a Baker Perkins Twin Screw of 50 mm barrel size having nine barrel sections, each barrel section having a heating element and cooling means. The proper cook is achieved under controlled temperature and pressure conditions using the following extruder operating parameters. A back pressure valve is used at the exit of the extruder/cooker to maintain barrel pressure and residence time in the extruder/cooker.

| Operating Conditions | |
| --- | --- |
| Dry feed rate: | 68 kg/hr. |
| Water rate: | 27 kg/hr |

| -continued | |
| --- | --- |
| Moisture content: | 34% |
| Barrel Temperature (C.) | |
| Section 1 | 68 |
| Section 2 | 99 |
| Section 3 | 127 |
| Section 4 | 135 |
| Section 5 | 141 |
| Section 6 | 166 |
| Section 7 | 177 |
| Section 8 | 182 |
| Section 9 | 182 |
| Screw RPM | 160 |
| Specific Mechanical Energy (HP hr/lb) | 0.020 |
| Exit Pressure (gauge) | 28.5 atm |
| Dough Temperature | 146° C. |

C. Particulate Matter

In this example granola is used as the particulate matter. The granola comprises (on a wet basis) 21.6% wheat flakes, 37.8% oat flakes, 0.35% sodium chloride, 5.2% non-fat dry milk, 2.3% flavoring agents and 23.2% brown sugar. The granola is sized by passing through a ⅜" round hole perforated screen and collecting the material which remains on a #8 mesh U.S. Standard screen.

D. Forming Step

Upon exiting the extruder/cooker, excess steam flashes off the cooked dough product, which is then introduced into the inlet of a 4.25 inch (10.8 cm) Bonnot forming extruder in conjunction with the granola. The granola is added to the forming extruder using a screw feeder at a feed rate of 27.25 kg/hr. A secondary cereal dough product comprising the cooked cereal dough and granola is formed in the forming extruder. This secondary cereal dough product is deaerated and formed in the forming extruder under a temperature of 100 degrees C. and a gauge pressure of 0.5 atm. The dough is forced through a die plate at the exit of the forming extruder, where it is cut into gelatinized pellets by a rotating knife. The die plate for this product is configured with 12 holes of 11/64 inch (0.44 cm) diameter each arranged in a single circle. The speed of the rotating knife controls the length of the pellets, which drop into a pellet transfer system. The resulting pellets have an average length of 0.3 cm. and a moisture content of approximately 23%.

E. Flaking

The pellets are conveyed to a Ross/Ferrel flaking device where they are converted into flakes via a vibratory pan feeder. During conveyance the pellets cool from 88° C. to 43° C. The operating conditions of the flaking device are:

| Pellet/flakes Moisture content | 23% |
| --- | --- |
| Roll gap | 0.125 cm |
| Roll speed | 100 RPM |
| Roll temperature | 36° C. |
| Roll pressure (gauge) | 91.5 atm |
| Feed rate | 123 kg/hr |

F. Toasting

The flakes are toasted in a three stage dump Proctor & Schwartz oven. Toasting is carried out under the following conditions:

| Residence time | |
| --- | --- |
| Zone 1 | 0.6 min. |

|  |  |
|---|---|
| Zone 2 | 1.3 min. |
| Zone 3 | 0.8 min. |
| Temperature | |
| Zone 1 | 199° C. |
| Zone 2 | 199° C. |
| Zone 3 | 163° C. |
| Air Flow Direction | |
| Zone 1 | up |
| Zone 2 | up |
| Zone 3 | down |
| Flake Moisture Profile | |
| Zone 1 - entrance | 23% |
| Zone 2 - entrance | 15% |
| Zone 3 - entrance | 7% |
| Zone 3 - exit | 1.0% |
| Bed Depth | |
| Zone 1 | 2.5 cm |
| Zone 2 | 5.1 cm |
| Zone 3 | 3.8 cm |

Following toasting the flakes are packaged and shipped.

Example 2

An oat bran flake cereal which incorporates apple pieces into the cooked dough matrix of the flake is prepared in the same manner as the process described in Example 1, including utilizing the same ingredients and equipment, except as noted herein.

A. Base Formula Batch Mixing

The following ingredients comprise the base mix, which is fed into an extruder/cooker to provide a cooked cereal dough having the desired characteristics. These ingredients are preconditioned prior to introduction into the extruder.

- 70.00% oat bran
- 6.00% oat bran concentrate
- 10.18% wheat flour
- 2.00% malted barley flour
- 11.00% brown sugar
- 0.62% salt
- 0.20% vitamins

B. Extrusion/Cooking

The same equipment described in Example 1 is used, except the barrel section of the extrusion cooker is shortened and only five barrel sections are necessary. The processing conditions are:

| Operating Conditions | |
|---|---|
| Dry feed rate: | 68 kg/hr |
| Water rate: | 27.2 kg/hr |
| Moisture content: | 34% |
| Barrel Temperature (C.) | |
| Section 1 | 66 |
| Section 2 | 93 |
| Section 3 | 121 |
| Section 4 | 149 |
| Section 5 | 177 |
| Screw RPM: | 160 |
| Specific Mechanical Energy (HP hr/lb): | 0.016 |
| Exit Pressure (gauge) | 27.2 atm |
| Dough Temperature: | 146° C. |

C. Particulate Matter

Low moisture dehydrated apple pieces are used for the particulate matter. They are sized through a #12 US Standard mesh. The apple pieces are added to the forming extruder at a rate of 17 kg/hr using a screw feeder.

D. Forming Step

A 4.25 inch (10.8 cm) Bonnot forming extruder is used to incorporate the apple pieces into the cooked dough matrix and is used to form pellets. The apple pieces are added to the forming extruder in conjunction with the cooked cereal dough from the extrusion cooker using a screw feeder at a rate of 26 kg/hr. The forming extruder is operated at a temperature of 100° C. and a gauge pressure of 0.5 atm. As described in Example 1 above, the dough is deaerated, formed, and cut into pellets at the die face. The speed of a rotating knife controls the length of the pellets, which are 0.6 cm. in length. The die plate is configured as described in Example 1. The resulting pellet has a moisture content of approximately 26%. The pellets are then conveyed to a flaking device, as described in Example 1.

E. Flaking

The same flaking system is used as in Example 1 and is operated under the following conditions:

| | |
|---|---|
| Moisture content | 26% |
| Roll gap | 0.125 cm |
| Roll speed | 105 RPM |
| Roll temperature | 36° C. |
| Roll pressure (gauge) | 91.5 atm. |
| Feed rate | 107 kg/hr |

F. Toasting

The cereal flakes are toasted in the equipment described in Example 1 under the following conditions:

| | |
|---|---|
| Residence Time | |
| Zone 1 | 0.6 min. |
| Zone 2 | 1.3 min. |
| Zone 3 | 0.8 min. |
| Temperature | |
| Zone 1 | 199° C. |
| Zone 2 | 199° C. |
| Zone 3 | 135° C. |
| Air Flow Direction | |
| Zone 1 | up |
| Zone 2 | up |
| Zone 3 | down |
| Flake Moisture Profile | |
| Zone 1 - entrance | 26% |
| Zone 2 - entrance | 15% |
| Zone 3 - entrance | 8% |
| Zone 3 - exit | 1.0% |
| Bad Depth | |
| Zone 1 | 2.5 cm |
| Zone 2 | 5.1 cm |
| Zone 3 | 3.8 cm |

The toasted flakes are packaged and shipped.

Example 3

A cereal flake prepared in accordance with Example 1 is further processed to attach relatively large-size edible particulate matter to the surface of the flake using a relatively small amount of adhesive material.

The flakes prepared in Example 1 are metered into a flow-through type enrober using a weight belt feeder. In the enrober two atomizing nozzles are used to spray 844 grams/min of syrup onto 1498 grams/min toasted flakes and 568 grams/min of instantized rolled oats. The instantized oats are sized such that all oats are above a #8 mesh US Standard screen. The syrup system is comprised of the following ingredients and is held at a temperature of 74°–79° C.

| | |
|---|---|
| Water | 28.80% |

-continued

|  |  |
|---|---|
| Corn syrup solids | 21.73% |
| Brown sugar | 23.90% |
| Table Sugar | 23.90% |
| Salt | 1.51% |
| Natural Coconut Flavor | 0.16% |

The enrobed flakes are dried using a three-stage Proctor & Schwartz single flat bed oven. The oven is operated under the following parameters:

|  |  |
|---|---|
| Residence Time | 11 min. |
| Temperature |  |
| Zone 1 | 143° C. |
| Zone 2 | 143° C. |
| Zone 3 | 121° C. |
| Air Flow Direction |  |
| Zone 1 | up |
| Zone 2 | down |
| Zone 3 | up |

Following drying the flakes are packaged and shipped.

What is claimed is:

1. A process for preparing ready-to-eat cereal flakes having edible particulate matter embedded therein, said process comprising:
   (a) preparing a dry mix comprising cereal grain and a plasticizer;
   (b) introducing the dry mix and water into an initial cooking and forming step under conditions sufficient to produce a cooked cereal dough product;
   (c) introducing edible particulate matter and the cooked cereal dough product into a secondary forming step under conditions sufficient to form a secondary cereal dough product having edible particulate matter embedded therein; and
   (d) converting the secondary cereal dough product into flakes.

2. A process according to claim 1 wherein the initial cooking and forming step is carried out in a twin-screw initial extruder and the secondary forming step is carried out in a separate, single-screw forming extruder.

3. A process according to claim 2 wherein the cereal grain in the dry mix comprises oat cereal grain and wheat cereal grain and wherein the plasticizer is sucrose.

4. A process according to claim 3 wherein the dry mix comprises from about 40% to about 60% by weight oat cereal grain, from about 35% to about 55% by weight wheat cereal grain, and from about 1% to about 10% by weight sucrose.

5. A process according to claim 4 wherein the amount of water added to the initial cooking and forming step is in the range of from about 3% to about 36% by weight of the total dry mix.

6. A process according to claim 5 wherein the throughput of the initial extruder is in the range of from about 22.5 to about 2,720 kilograms cooked cereal dough product per hour, and the dry mix/water mixture is cooked in the initial extruder at a temperature of from about 120 degrees C. to about 205 degrees C. for a period of from about 15 seconds to about 75 seconds.

7. A process according to claim 6 wherein from about 0.10 to about 0.40 kg. edible particulate matter per kg. cooked cereal dough product is added to the forming extruder.

8. A process according to claim 7 wherein the cooked cereal dough product/edible particulate matter mixture in the forming extruder is maintained at a temperature of from about 25 degrees C. to about 100 degrees C. for a period of from about 0.5 to about 5 minutes.

9. A process according to claim 8 wherein the edible particulate matter is selected from granola, fruit and fruit pieces, dehydrated fruit and fruit pieces, raw oat particles, and mixtures thereof.

10. A process according to claim 9 wherein the secondary cereal dough product has a moisture content of from about 18% to about 30% by weight.

11. A process according to claim 10 wherein the pellets are conveyed to the flaking step via pneumatic conveyance.

12. A process according to claim 11 wherein the flakes resulting from the flaking step have a thickness in the range of from about 0.10 mm to about 0.65 mm.

13. A process according to claim 12 wherein the flakes are toasted in an oven at a temperature in the range of from about 120 degrees C. to about 260 degrees C. for a period of time ranging from about 0.2 minutes to about 15 minutes.

14. A process according to claim 13 wherein the flakes are subjected to an enrobing process following toasting and then dried, said enrobing process comprising coating said flakes with a syrup to form a substantially continuous and discrete film thereon.

15. A process according to claim 14 wherein the flakes are subjected to an enrobing process following toasting and prior to drying, said enrobing process comprising coating the surface of said flakes with edible particulate matter and a vehicle for attaching said particulate matter to the flake surface.

16. A process according to claim 15 wherein the edible particulate matter attached to the flake surface comprises granola, fruit and fruit pieces, dehydrated fruit and fruit pieces, raw oat particles, and mixtures thereof.

17. A process according to claim 16 wherein the vehicle for attaching said edible particulate matter to said flake comprises a syrup comprising from about 20% to about 40% by weight water, from about 40% to about 60% by weight sweetener, from about 1.0% to about 2.5% by weight salt and from about 0.01% to about 0.10% by weight flavoring agents.

18. A ready-to-eat cereal flake having edible particulate matter embedded therein prepared by the process comprising:
   (a) preparing a dry mix comprising cereal grain and a plasticizer;
   (b) introducing the dry mix and water into an initial cooking and forming step under conditions sufficient to produce a cooked cereal dough product;
   (c) introducing edible particulate matter and the cooked cereal dough product into a secondary forming step under conditions sufficient to form a secondary cereal dough product having edible particulate matter embedded therein in a substantially uniform manner; and
   (d) converting the secondary cereal dough product into flakes having edible particulate matter embedded therein in a substantially uniform manner.

* * * * *